US011120545B2

(12) United States Patent
Lee et al.

(10) Patent No.: US 11,120,545 B2
(45) Date of Patent: Sep. 14, 2021

(54) METHOD FOR MEASURING HOLE PROVIDED IN WORKPIECE

(71) Applicant: INDUSTRIAL TECHNOLOGY RESEARCH INSTITUTE, Hsinchu (TW)

(72) Inventors: Chun-Yi Lee, Chiayi (TW); Tsai-Ling Kao, Tainan (TW); Hian-Kun Tenn, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 29 days.

(21) Appl. No.: 16/837,597

(22) Filed: Apr. 1, 2020

(65) Prior Publication Data

US 2021/0192705 A1 Jun. 24, 2021

(30) Foreign Application Priority Data

Dec. 18, 2019 (TW) .................................. 108146346

(51) Int. Cl.
*G06T 7/00* (2017.01)
*G06T 7/149* (2017.01)
*G01B 5/12* (2006.01)

(52) U.S. Cl.
CPC .............. *G06T 7/001* (2013.01); *G01B 5/12* (2013.01); *G06T 7/149* (2017.01); *G06T 2207/10028* (2013.01); *G06T 2207/30164* (2013.01)

(58) Field of Classification Search
CPC ..................... G06T 7/001; G06T 7/149; G06T 2207/10028; G06T 2207/30164; G01B 5/12
See application file for complete search history.

(56) References Cited

U.S. PATENT DOCUMENTS

| 4,647,208 A | 3/1987 | Bieman |
| 7,372,558 B2 | 5/2008 | Kaufman et al. |

(Continued)

FOREIGN PATENT DOCUMENTS

| CN | 1322304 C | 6/2007 |
| CN | 101221122 A | 7/2008 |

(Continued)

OTHER PUBLICATIONS

Mogali et al, Templet-Based Active Contours, arXiv 1312.0760v1 Dec. 3 (Year: 2013).*

(Continued)

*Primary Examiner* — Ping Y Hsieh
*Assistant Examiner* — Xiao Liu
(74) *Attorney, Agent, or Firm* — Maschoff Brennan

(57) ABSTRACT

A method for measuring a hole provided in a workpiece is provided and the method comprises: obtaining a three-dimensional point cloud model of the workpiece and a two-dimensional image of the workpiece, defining a first contour in the three-dimensional point cloud model based on an intensity difference of the two-dimensional image, defining a second contour and a third contour respectively based in the first contour, bounding a data point testing region between the second contour and the third contour, respectively defining data point sampling regions along a plurality of cross-section directions of the data point testing region, respectively sampling data points in the data point sampling regions to obtain a turning point set comprising turning points, wherein each of the turning points has the largest turning margin, connecting the turning points which are distributed in the turning point set along a ring direction to obtain an edge of the hole.

10 Claims, 10 Drawing Sheets

(56) References Cited

U.S. PATENT DOCUMENTS

| | | |
|---|---|---|
| 7,454,265 B2 | 11/2008 | Marsh |
| 8,141,263 B2 | 3/2012 | Huang |
| 8,379,014 B2 | 2/2013 | Wiedemann et al. |
| 8,606,540 B2 | 12/2013 | Haisty et al. |
| 9,068,809 B1 | 6/2015 | Lagally et al. |
| 9,157,735 B2 | 10/2015 | Haisty et al. |
| 9,760,986 B2 | 9/2017 | Ramamurthy et al. |
| 2003/0063291 A1 | 4/2003 | Bloch et al. |
| 2008/0195353 A1 | 8/2008 | Igasaki et al. |
| 2008/0298538 A1 | 12/2008 | Wen et al. |
| 2009/0248355 A1 | 10/2009 | Kriegmair |
| 2011/0166824 A1 | 7/2011 | Haisty et al. |
| 2017/0132836 A1* | 5/2017 | Iverson .............. G06T 17/10 |
| 2019/0392595 A1* | 12/2019 | Uhlenbrock .......... G06T 7/74 |

FOREIGN PATENT DOCUMENTS

| | | |
|---|---|---|
| CN | 101315341 A | 12/2008 |
| CN | 100453965 C | 1/2009 |
| CN | 100480619 C | 4/2009 |
| CN | 100526831 C | 8/2009 |
| CN | 101351115 B | 12/2010 |
| CN | 101929837 B | 6/2012 |
| CN | 203480322 U | 3/2014 |
| CN | 103886593 A | 6/2014 |
| CN | 106970027 A | 7/2017 |
| CN | 108489388 A | 9/2018 |
| DE | 10002768 A1 | 9/2000 |
| DE | 19941771 B4 | 10/2010 |
| TW | 200951999 A | 12/2009 |
| TW | 201226849 A | 7/2012 |
| TW | I427266 B | 2/2014 |
| TW | 201410313 A | 3/2014 |
| TW | I629461 B | 7/2018 |
| WO | 2015/098929 A1 | 7/2015 |

OTHER PUBLICATIONS

TW Office Action in Application No. 108146346 dated Sep. 1, 2020.

Malassiotis et al. "Stereo vision system for precision dimensional inspection of 3D holes" Machine Vision and Applications; Apr. 2003.

Smith et al. "Integrated Hole and Countersink Inspection of Aircraft Components" SAE Technical Paper 2013-01-2147, Sep. 17, 2013.

Ryan Haldimann "3D Countersink Measurement" SAE Technical Paper 2015-01-2510; Sep. 15, 2015.

* cited by examiner

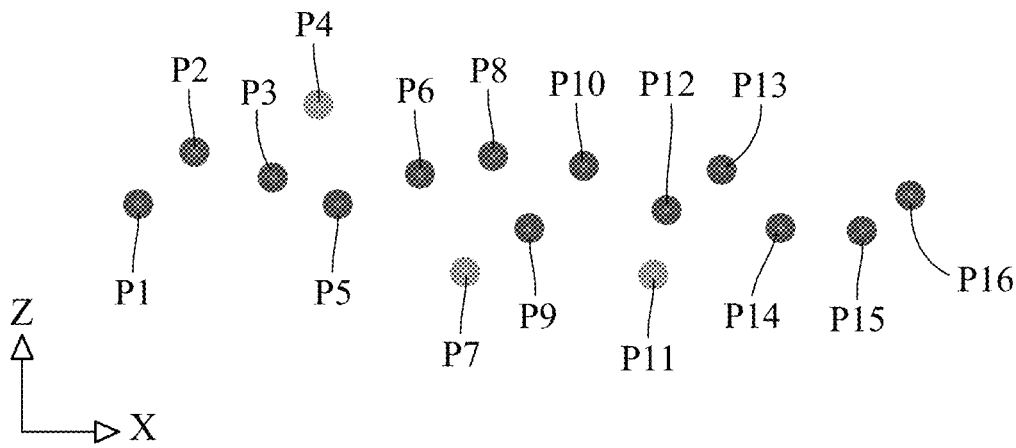

FIG. 4

```
┌─────────────────────────────────────────────┐
│ respectively calculating Z-axis standard    │──S106-1
│ deviations of the data point sampling       │
│ regions                                     │
└─────────────────────────────────────────────┘
                      │
                      ▼
┌─────────────────────────────────────────────┐
│ respectively performing a linear fitting    │
│ algorithm for the data point sampling       │──S106-2
│ regions to obtain a plurality of data       │
│ point sampling segments based on the Z-axis │
│ standard deviations                         │
└─────────────────────────────────────────────┘
                      │
                      ▼
┌─────────────────────────────────────────────┐
│ removing the data points whose Z-axis       │
│ coordinates are larger than the Z-axis      │──S106-3
│ standard deviation in each of the data      │
│ point sampling regions                      │
└─────────────────────────────────────────────┘
                      │
                      ▼
┌─────────────────────────────────────────────┐
│ performing a window algorithm for the data  │
│ points which are distributed inside the     │──S106-4
│ data point sampling segments to obtain the  │
│ turning point set                           │
└─────────────────────────────────────────────┘
```

FIG. 5

METHOD FOR MEASURING HOLE PROVIDED IN WORKPIECE

CROSS-REFERENCE TO RELATED APPLICATIONS

This non-provisional application claims priority under 35 U.S.C. § 119(a) on Patent Application No(s). 108146346 filed in Republic of China on Dec. 18, 2019, the entire contents of which are hereby incorporated by reference.

BACKGROUND

1. Technical Field

This disclosure relates to a method for measuring a hole, especially for a hole provided on a workpiece.

2. Related Art

Because a demand for a precision of an electronic product is increased and there are various types of the electronic product, such as a mobile device, a medical equipment or an automotive electronic, a full inspection of holes provided in a measured workpiece will become an inevitable trend. With respect to a measurement of a size of each of the holes, a demand for measuring a three-dimensional (3D) hole is obviously increased, so many people have focus on developing a measurement technology for the 3D hole.

Improving a precision of obtaining turning points of a contour of a respective hole is always a key factor for measuring the 3D hole and the threshold thereof is high. At present, a person still uses a plug gauge to directly contact with a straight hole or a countersunk hole for obtaining the size of the straight hole or the countersunk hole. When the number of the 3D holes is numerous, measuring all of the 3D holes must take much time. Moreover, an accuracy for measuring the 3D holes is low because measuring the 3D holes are operated by different people. In order to maintain the efficiency and the quality for measuring the 3D holes, developing a method with non-contact and automation means for measuring the 3D holes is the only way to comply with a market demand of rapid measurement.

SUMMARY

Accordingly, this disclosure provides a method for measuring a hole provided in a workpiece, via the usage of 2D image data and the usage of 3D point cloud data related to the hole provided in the workpiece, an edge of the hole provided in the workpiece can be measured rapidly and accurately.

According to one or more embodiment of this disclosure, a method for measuring a hole provided in a workpiece, and the method comprising: respectively obtaining a three-dimensional point cloud model of the workpiece and a two-dimensional image of the workpiece; defining a first contour in the three-dimensional point cloud model according to an intensity difference of the two-dimensional image; respectively defining a second contour and a third contour in the three-dimensional point cloud model based on the first contour; bounding a data point testing region, wherein the second contour and the third contour are boundaries of the data point testing region respectively; respectively defining a plurality of data point sampling regions along a plurality of cross-section directions of the data point testing region, wherein each of the cross-section directions extends from the third contour to the second contour; respectively sampling a plurality of data points in the data point sampling regions to obtain a turning point set, wherein the turning point set has a plurality of turning points, the turning points respectively are distributed in the data point sampling regions and the turning points have the largest turning margins in the data point sampling regions respectively; and connecting the turning points which are distributed in the turning point set along a ring direction to obtain an edge of the hole.

In view of the above description, at first, a reflection intensity information related to the two-dimensional image is used to rapidly estimate a position of the hole provided in a surface of the workpiece, thereby solving prior disadvantages of processing a huge amount of data points and taking much time to obtain the three-dimensional point cloud of the workpiece. Furthermore, through the usage of the two-dimensional image and the three-dimensional point cloud model, it is possible to more accurately determine whether the data points conform to the edge of the hole provided in the workpiece, to achieve an effect of accurately measuring and rapidly achieving a full inspection for the holes provided in the workpiece.

BRIEF DESCRIPTION OF THE DRAWINGS

The present disclosure will become more fully understood from the detailed description given herein below and the accompanying drawings which are given by way of illustration only and thus are not limitative of the present disclosure and wherein:

FIG. 4 is a schematic view of sampling data points in the data point sampling region along one of the cross-section directions of FIG. 3;

FIG. 5 is a flowchart showing steps of determining an edge of the hole of FIG. 1;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
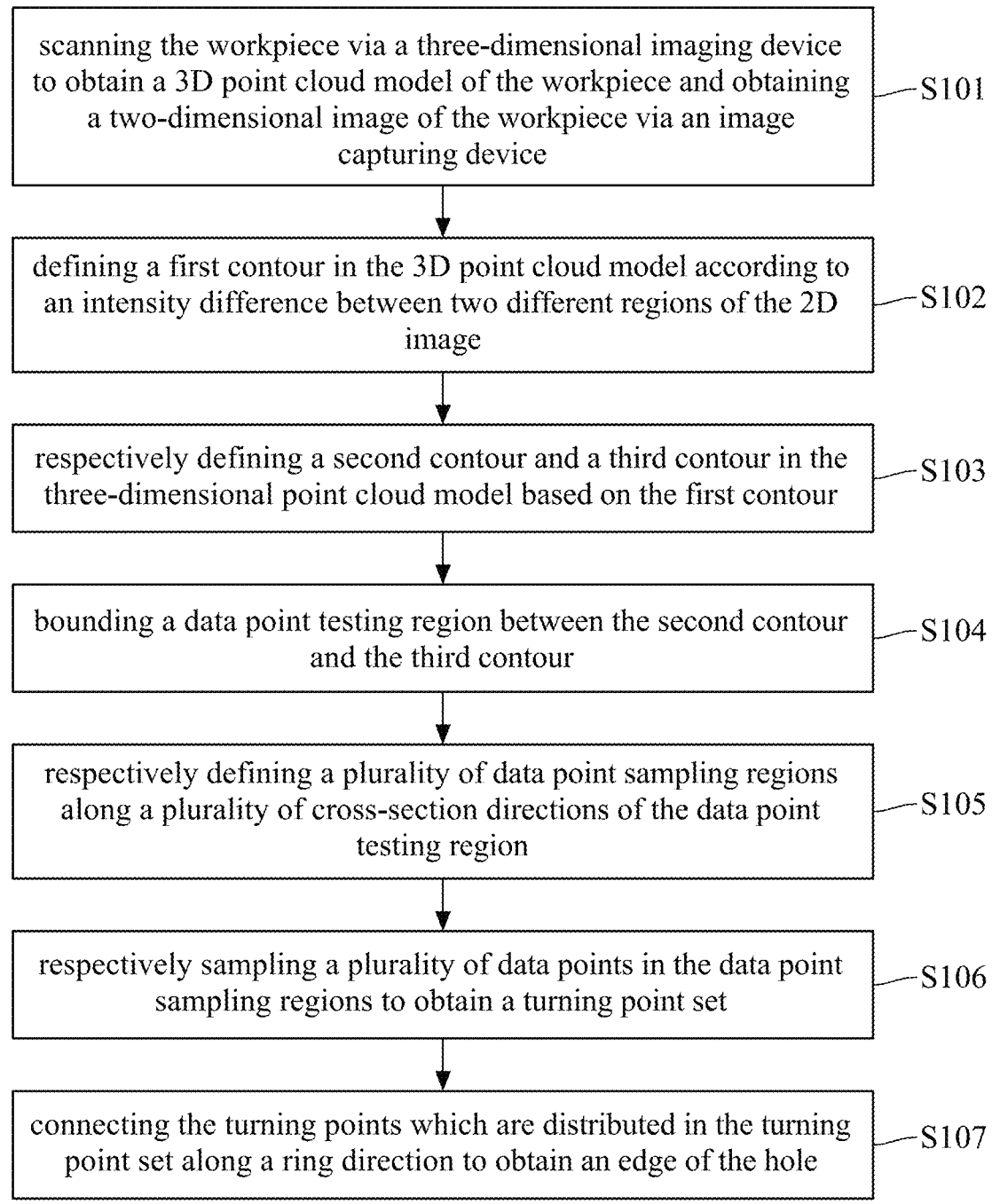
FIG. 1 is a flowchart of a method for measuring a hole provided in a workpiece according to a first embodiment of the present disclosure.

Please refer to FIG. 1 which is a flowchart of a method for measuring a hole provided in a workpiece according to a first embodiment of the present disclosure. As shown in FIG. 1, a step S101 comprises scanning the workpiece via a three-dimensional (3D) imaging device to obtain a 3D point cloud model of the workpiece and obtaining a two-dimensional (2D) image of the workpiece via an image capturing device. The 3D imaging device may be a structured light scanner or a laser scanner. The 3D point cloud model comprises a plurality of data points, and each of the data points has a 3D coordinate information and a color information. The 2D image has an image intensity information. The image intensity information comprises a grayscale intensity of the 2D image. A step S102 is defining a first contour in the 3D point cloud model according to an intensity difference between two different regions of the 2D image. More specifically, the 2D image comprises a first region image and a second region image, wherein a grayscale intensity of the first region image is smaller than a grayscale intensity of the second region image, thereby regarding the first image region as the hole provided in a surface of the workpiece and regarding an edge of the first region image as the first contour, wherein the first contour has a center point. A step S103 is respectively defining a second contour and a third contour in the three-dimensional point cloud model based on the first contour. The first, the second and the third contours commonly share the center point, the first contour surrounds the second contour, and there is a first radius ratio between the first contour and the second contour. The third contour surrounds the first contour and the second contour, and there is a second radius ratio between the third contour and the first contour. In this embodiment, the first radius ratio is equal to the second radius ratio, which means that the first contour bounds the second contour and the third contour respectively according to the same ratio. In other embodiments, the first radius ratio may be different from the second radius ratio, which means that the first contour bounds the second contour and the third contour with different ratios respectively. A step S104 is bounding a data point testing region between the second contour and the third contour, wherein the second and the third contours respectively are two boundaries of the data point testing region, whereby estimating a position of the edge of the hole provided in the surface of the workpiece. A step S105 is respectively defining a plurality of data point sampling regions along a plurality of cross-section directions of the data point testing region, wherein each of the cross-section directions extends from the second contour to the third contour and each of the data point sampling region has a plurality of data points. A step S106 is respectively sampling a plurality of data points in the data point sampling regions to obtain a turning point set. More specifically, the turning point set has a plurality of turning points, the turning points respectively are distributed in the data point sampling regions and the turning points have the largest turning margins in the data point sampling regions respectively. A step S107 is connecting the turning points which are distributed in the turning point set along a ring direction to obtain an edge of the hole.

Figure 2:
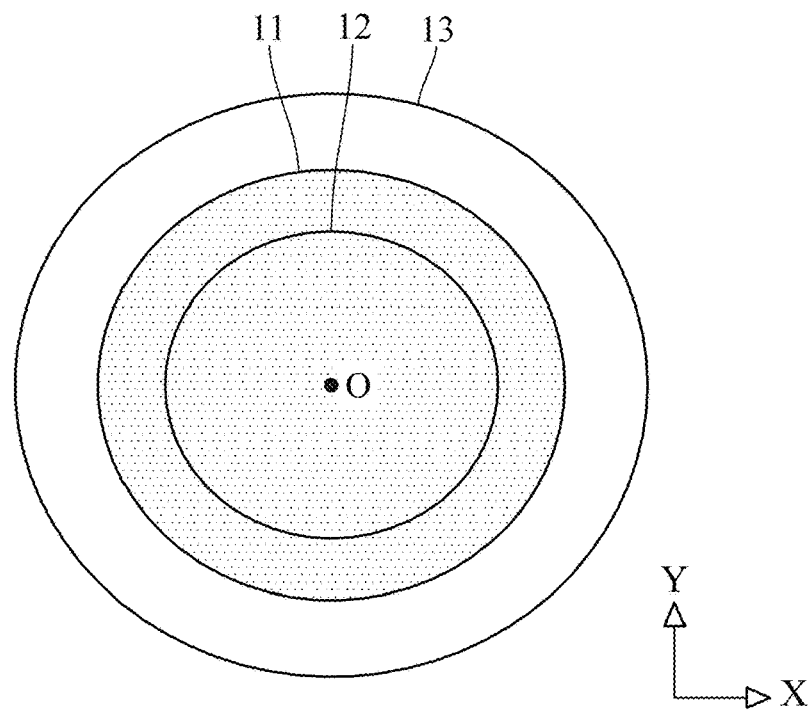
FIG. 2 is a schematic view of bounding a data point testing region of FIG. 1.

FIG. 2 is a schematic view of bounding the data point testing region of FIG. 1. In order to understanding the steps S103 and S104 more clearly, please refer to FIG. 1 and FIG. 2 together. The first contour 11 surrounds the second contour 12, and the third contour 13 surrounds the first contour 11. The second contour 12 and the third contours 13 are two boundaries of an annular region respectively, and the annular region may be regarded as the data point testing region of the step S104.

Figure 3:
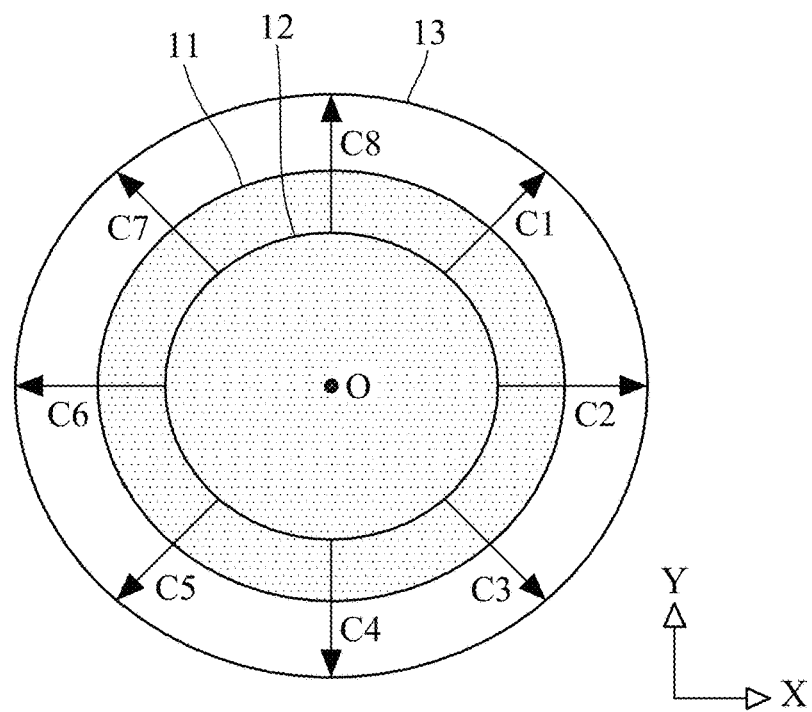
FIG. 3 is a schematic view of defining a data point sampling region of FIG. 1.

FIG. 3 is a schematic view of defining the data point sampling region of FIG. 1. In order to understanding technology means of the step S105 more clearly, please refer to FIG. 1 and FIG. 3 together. In the annular region bounded between the second contour 12 and the third contour 13, a plurality of cross-section directions C1 to C8 outwardly extend from the second contour 12 to the third contour 13 based on a common center point O and the same angular intervals. FIG. 4 is a schematic view of sampling the data points in the data point sampling region along one of the cross-section directions of FIG. 3. As shown in FIG. 4, data points P1 to P16 are distributed along the cross-section direction C2 of the data point testing region. The data points P1 to P16 are distributed along a Z-axis direction. In other embodiments, the angular intervals related to the cross-section directions C1 to C8 may be different based on the common center point O. In this embodiment, the data points which are distributed in the data point sampling region may be represented by a rectangular coordinate system. In other embodiments, the data points which are distributed in the data point sampling region may be represented by a polar coordinate system.

FIG. 5 is a flowchart showing detail steps of determining the edge of the hole of FIG. 1. As shown in FIG. 5, a step S106-1 is respectively calculating Z-axis standard deviations of the data point sampling regions. More specifically, at each of the data point sampling regions, the data points which are distributed in the data point sampling regions have different Z-axis coordinates from the first contour 11 to the third contours 13, and the Z-axis standard deviations are calculated based on the Z-axis coordinates. A step S106-2 is respectively performing a linear fitting algorithm for the data point sampling regions to obtain a plurality of data point sampling segments based on the Z-axis standard deviations, wherein a length of each of the data point sampling segments 14 extends from the second contour 12 to the third contours 13, and a width of each of the data point sampling segments 14 along a Z-axis direction is the same as the Z-axis standard deviation. For each of the data point sampling regions, a step S106-3 is removing the data points whose Z-axis coordinates are larger than the Z-axis standard deviation in each of the data point sampling regions. More specifically, the data points which are distributed outside the data point sampling segment 14 are regarded as outliers (abnormal data points). A step S106-4 is performing a window algorithm for the data points which are distributed inside the data point sampling segments 14 to obtain the turning point set. More specifically, the window algorithm creates two virtual windows which have the same size for each of the data points which are distributed in the data point sampling segments 14, and the window algorithm may determine a difference between the number of the data points which are distributed in one of the two virtual windows and the number of the data points which are distributed in the other virtual window, determine the data point which has the largest difference between the two virtual windows as the turning point in the data point sampling segment 14.

Figure 6:
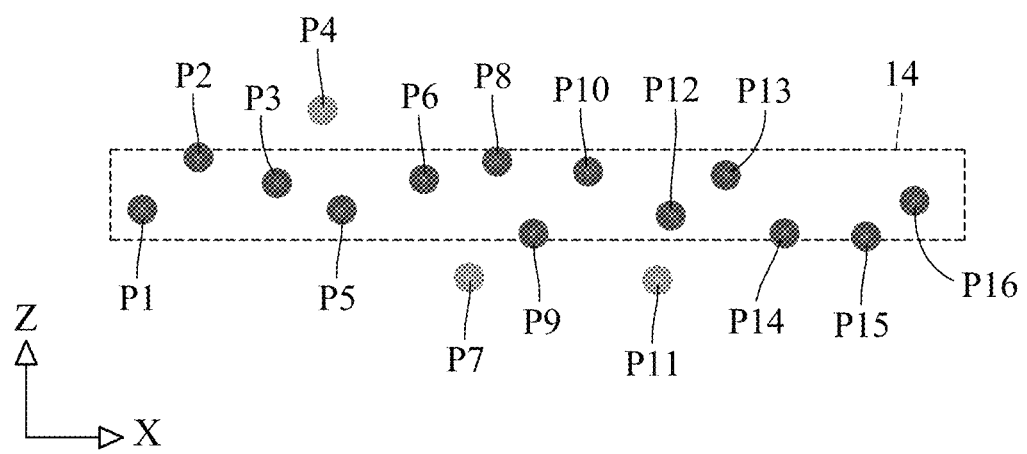
FIG. 6 is a schematic view of defining the data point sampling segments of FIG. 5.

FIG. 6 is a schematic view of defining the data point sampling segment 14 of FIG. 5, for understanding the technical content of step S106-2 and step S106-3 more clearly, please refer to FIG. 1 and FIG. 5 together. The widths of the data point sampling segment 14 along the Z-axis direction is equal to the Z-axis standard deviation of the data point sampling region. The data points P4, P7, and P11 are distributed outside the data point sampling segment 14. In this embodiment, the data points P4, P7, and P11 are regarded as outliers.

Figure 7:
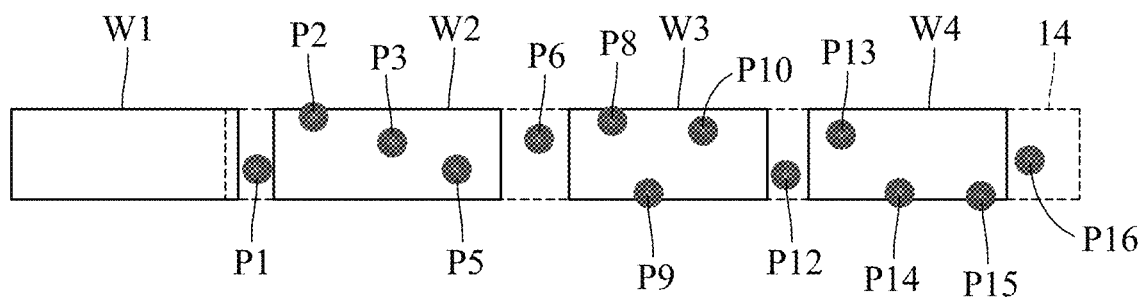
FIG. 7 is a schematic view of obtaining a turning point set of FIG. 5.

FIG. 7 is a schematic view of obtaining the turning point set of FIG. 5; For understanding the technical content of step S106-4 more clearly, please refer to FIG. 5 and FIG. 7 together. The window algorithm creates the two virtual windows which have the same size for each of the data points in the data point sampling segment 14 (except the data points P4, P7, and P11). For example, the window algorithm creates a first virtual window W1 and a second virtual window W2 for the data point P1, the window algorithm creates a third virtual window W3 and a fourth virtual window W4 for the data point P12. The number of the data points which are distributed in the first virtual window W1 is zero, the number of the data points (P2, P3 and P5) which are distributed in the second virtual window W2 is three, the number of the data points (P8, P9 and P10) which are distributed in the third virtual window W3 is three, and the number of the data points (P13, P14, and P15) which are distributed in the fourth virtual window W4 is three. The difference between the number of the data points which are distributed in the first virtual window W1 and the number of the data points which are distributed in the second virtual window W2 is three, the difference between the number of the data points which are distributed in the second virtual window W2 and the number of the data points which are distributed in the third virtual window W3 is zero, and the difference between the number of the data points which are distributed in the third virtual window W3 and the number of the data points which are distributed in the fourth virtual window W4 is zero. Because the difference of the number of the data points between the first virtual window W1 and the second virtual window W2 is the largest, the data point P1 may be determined as one of the turning points. It can be understood that the window algorithm may determine the other turning points in the other data point sampling segments 14 extending along the other cross-section directions, and finally the turning points which are distributed in the data point sampling segments respectively are sampled to create the turning point set.

In addition to the window algorithm, the present disclosure further provides another method for determining the edge of the hole. In the another method for determining the edge of the hole, the second derivatives of the data points which are distributed in the data point sampling segment 14 may be calculated, and the data point which is served as one of the edge points of the hole has a negative second derivative.

Figure 8:
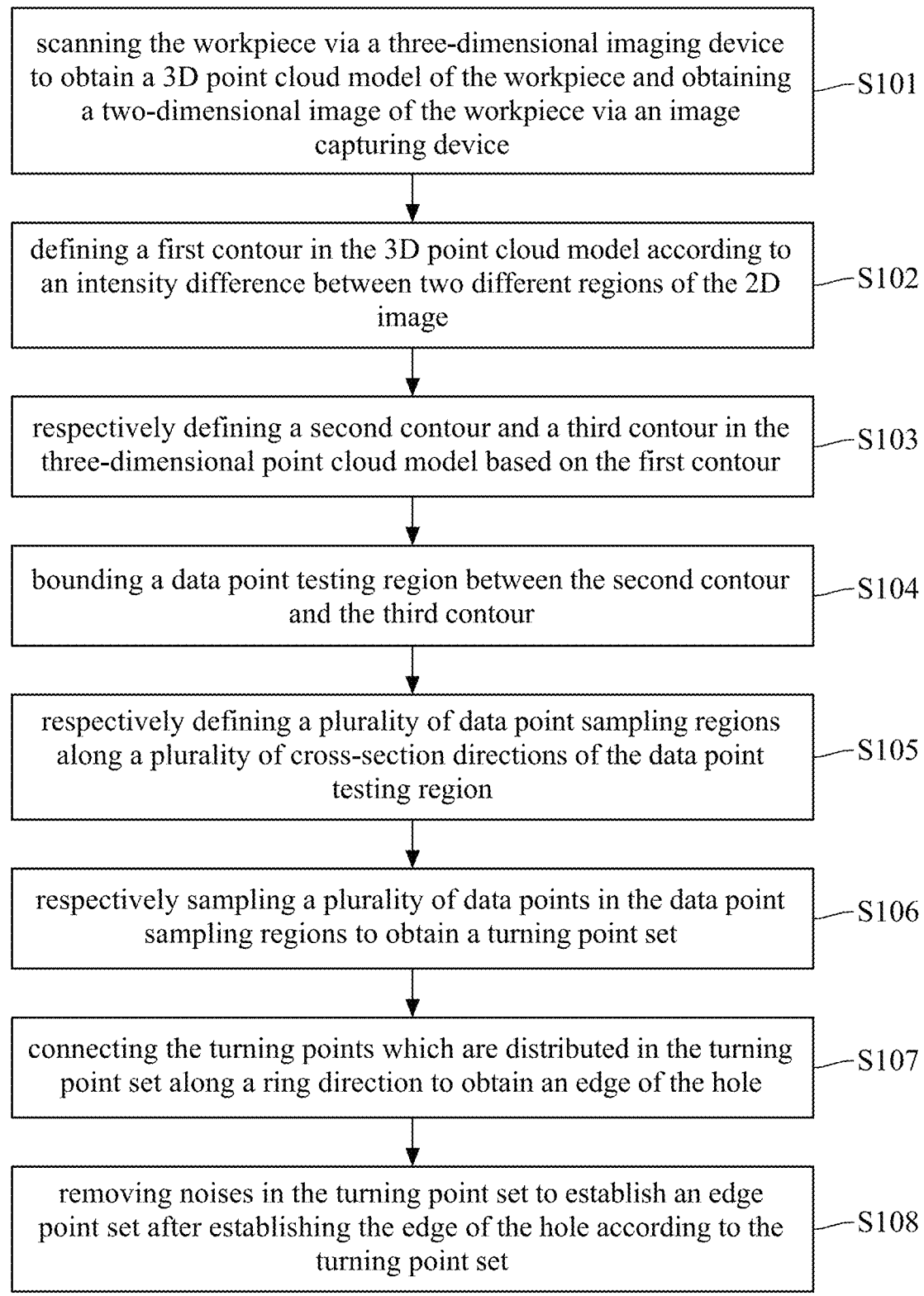
FIG. 8 is a flowchart of a method for measuring the hole provided in the workpiece according to a second embodiment of the present disclosure.

FIG. 8 is a flowchart of a method for measuring the hole provided in the workpiece according to a second embodiment of the present disclosure. As shown in FIG. 8, the second embodiment of the method for measuring the hole provided in the workpiece further comprises a step S108, and the step S108 is removing noises in the turning point set to establish an edge point set after establishing the edge of the hole according to the turning point set.

Figure 9:
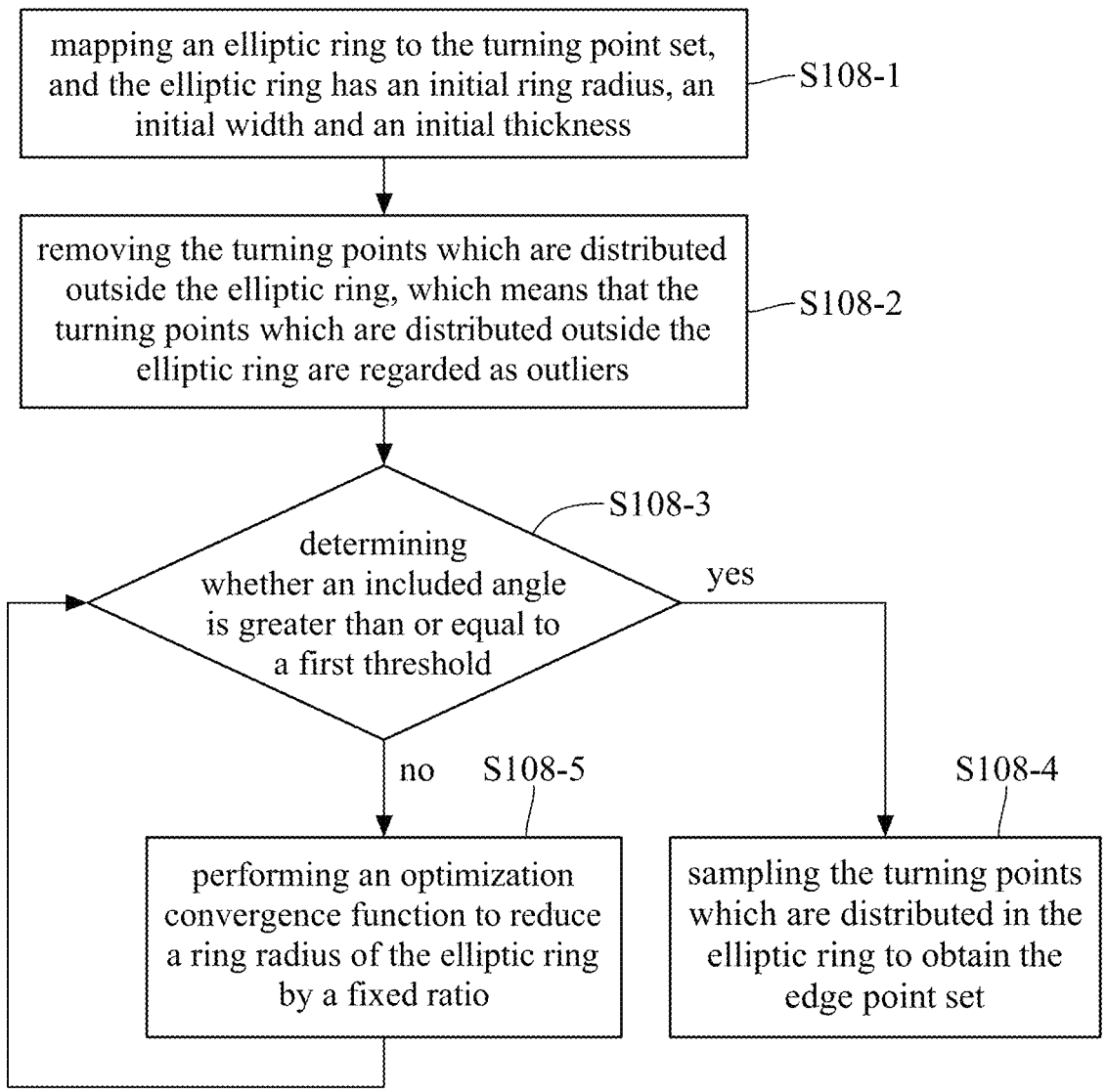
FIG. 9 is a flowchart showing steps of removing noises in the turning point set of FIG. 8.

FIG. 9 is a flowchart showing steps of removing the noises in the turning point set of FIG. 8. As shown in FIG. 9, A step S108-1 is mapping an elliptic ring to the turning point set, and the cubic ring has an initial ring radius, an initial width and an initial thickness. A step S108-2 is removing the turning points which are distributed outside the elliptic ring, which means that the turning points which are distributed outside the elliptic ring are regarded as outliers. A step S108-3 is determining whether an included angle is greater than or equal to a first threshold, wherein the included angle is between a first line and a second line, the first line is defined by one of the turning points which is distributed in the elliptic ring and an elliptical center point, and the second line is defined by another one of the turning points which is distributed in the elliptic ring and the elliptical center point. When the included angle is greater than or equal to the first threshold, then a step S108-4 is executed. When the included angle is smaller than the first threshold, then a step S108-5 is executed. The step S108-4 is sampling the turning points which are distributed in the elliptic ring to obtain the edge point set. More specifically, the turning points which are distributed in the elliptic ring are regarded as the edge points, and the edge points are collected to establish the edge point set. A step S108-5 is performing an optimization convergence function (shown below) to reduce a ring radius of the elliptic ring by a fixed ratio, and then the Step S108-3 is executed after the reduction of the ring radius every time.

The optimization convergence function: Interaction (Max ($\Sigma_{p \in P_{remain}} T(p, r)$)). P is the turning point, r is the ring radius of the elliptic cubic ring.

T(p, r)=1, p is located in the elliptic ring.

T(p, r)=0, p is located outside the elliptic ring.

Figure 10A:
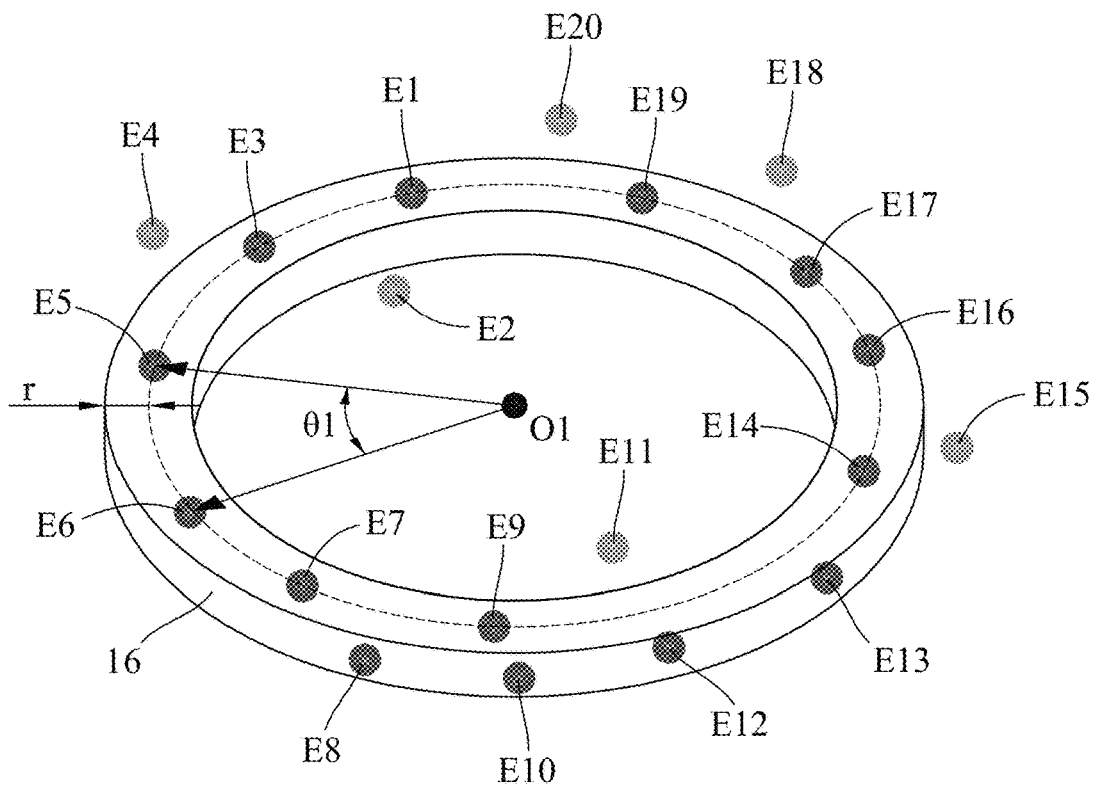
FIG. 10A and FIG. 10B are schematic views of removing the noises in the turning point set of FIG. 8.
Figure 10B:
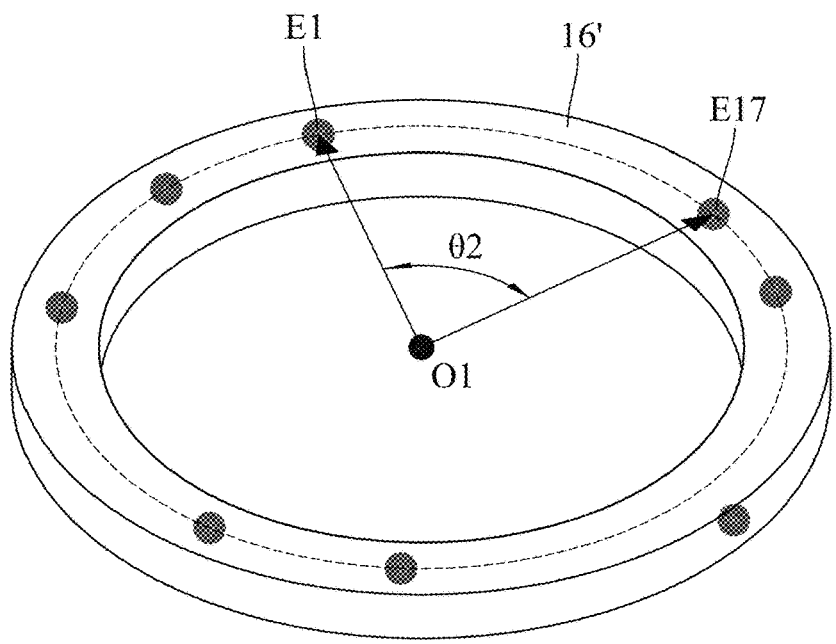

FIG. 10A and FIG. 10B are schematic views of removing the noises in the turning point set of FIG. 8. As shown in FIG. 10A, the turning point set comprises a plurality of turning points E1 to E20, and the elliptic ring 16 has an elliptical center point O1, wherein the turning points E2, E4, E11, E15, E18, and E20 are distributed outside the elliptic ring 16, so the turning points E2, E4, E11, E15, E18 and E20 are regarded as outliers and then the turning points E2, E4, E11, E15, E18 and E20 are removed. Furthermore, an included angle $\theta_1$ between a line extending from the elliptical center point O1 to the turning point E5 and another line extending from the elliptical center point O1 to the turning point E6 is smaller than the first threshold, so the optimal convergence function is performed to reduce the ring radius (r) of the elliptic ring 16. As shown in FIG. 10B, since an included angle $\theta_2$ between the turning points E1 and E17 in a reduced elliptic cubic ring 16' is judged to be greater than the first threshold, the execution of the optimized convergence function is ended.

Figure 11:
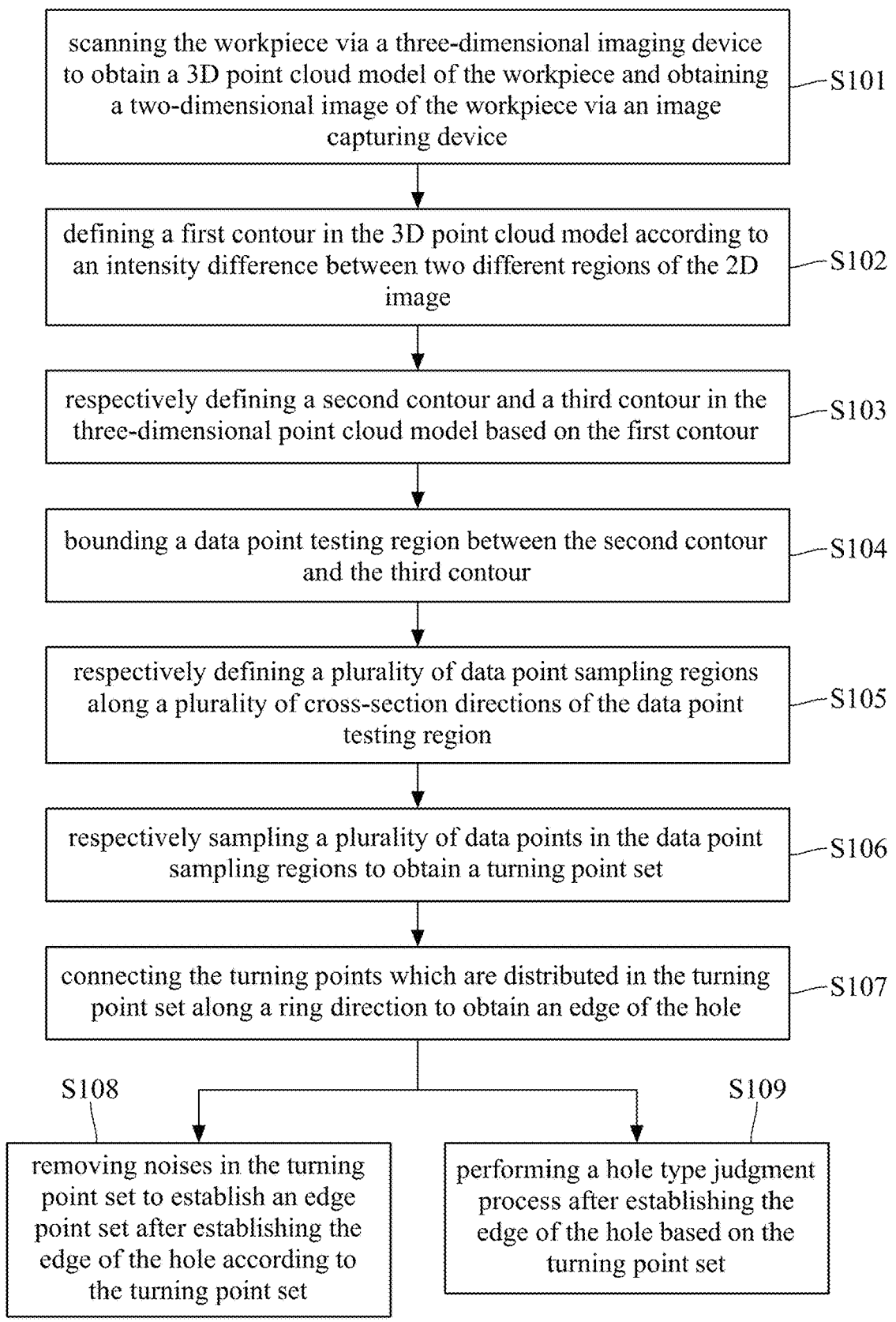
FIG. 11 is a flowchart of a method for measuring the hole provided in the workpiece according to a third embodiment of the present disclosure.

FIG. 11 is a flowchart of a method for measuring the hole provided in the workpiece according to a third embodiment of the present disclosure. As shown in FIG. 11, the third embodiment of the method for measuring the hole provided in the workpiece further comprises a step S109. The step S109 is performing a hole type judgment process after establishing the edge of the hole based on the turning point set.

Figure 12:
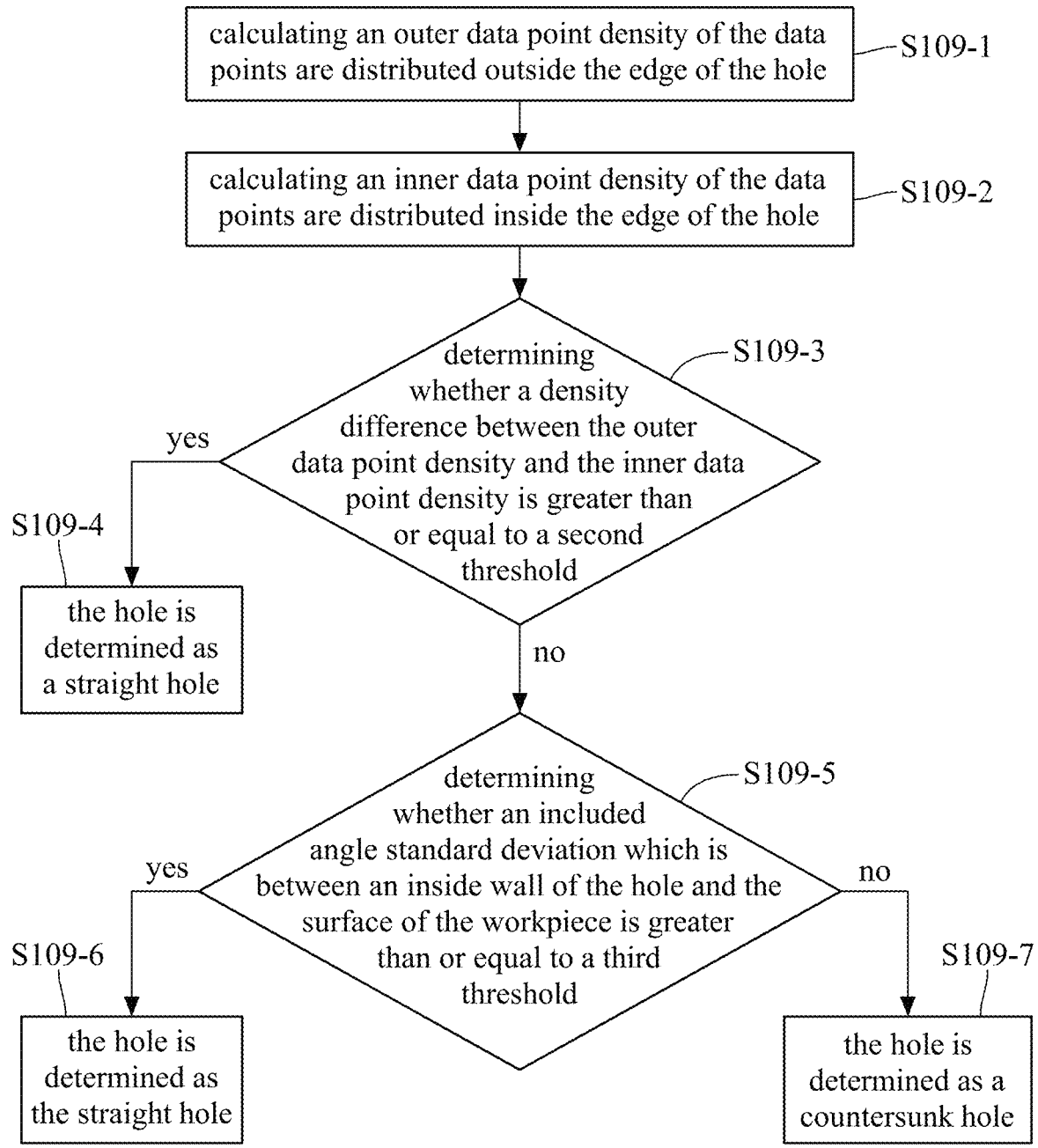
FIG. 12 is a flowchart showing steps of a hole type determining process of FIG. 11.

FIG. 12 is a flowchart showing steps of a hole type judgment process of FIG. 11. As shown in FIG. 12, a step S109-1 is calculating an outer data point density of the data points are distributed outside the edge of the hole. A step S109-2 is calculating an inner data point density of the data points which are distributed inside the edge of the hole. A step S 109-3 is determining whether a density difference between the outer data point density and the inner data point density is greater than or equal to a second threshold. When the density difference is greater than or equal to the second threshold, a step S109-4 is executed. In the step S109-4, the hole is determined as a straight hole. More specifically, there are data points at an outside of the edge of the straight hole. On the other hand, there are almost no data points at an inside of the edge of the straight hole. Therefore, the density difference between the outside of the edge of the straight hole and the inside of the edge of the straight hole should be very large. Therefore, when the density difference between the outside of the edge of the hole and the inside of the edge of the hole is too large, the hole has a high probability of being determined as the straight hole. Conversely, when the density difference is less than the second threshold, then a step S109-5 is performed, wherein the step S109-5 is determining whether an included angle standard deviation which is between an inside wall of the hole and the surface of the workpiece is greater than or equal to a third threshold. When the included angle standard deviation is greater than or equal to the third threshold, then a step S109-6 is performed. In the step S109-6, the hole is determined as the straight hole. When the included angle standard deviation is less than the third threshold, then a step S109-7 is performed. In the step S109-7, the hole is determined as a countersunk hole. More specifically, the included angle standard deviation which is between an inside wall of the straight hole and the surface of the workpiece is greater than the included angle standard deviation which is between an inside wall of the countersunk hole and the surface of the workpiece, wherein the inner wall of the countersunk hole is defined between an edge of an outer hole of the countersunk hole and an edge of an inner hole of the countersunk hole.

Figure 13A:
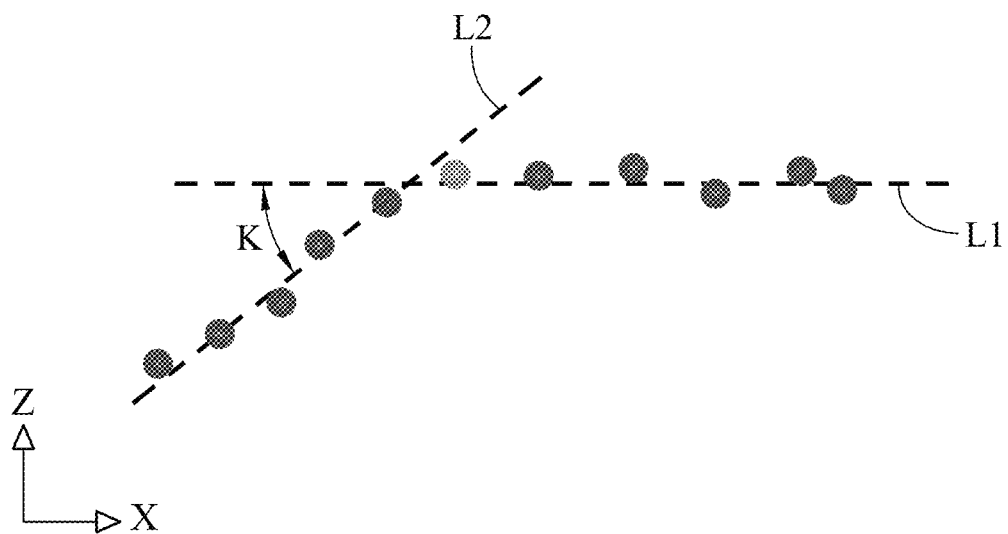
FIG. 13A is a schematic view showing a data point distribution of a countersunk hole of FIG. 12.
Figure 13B:
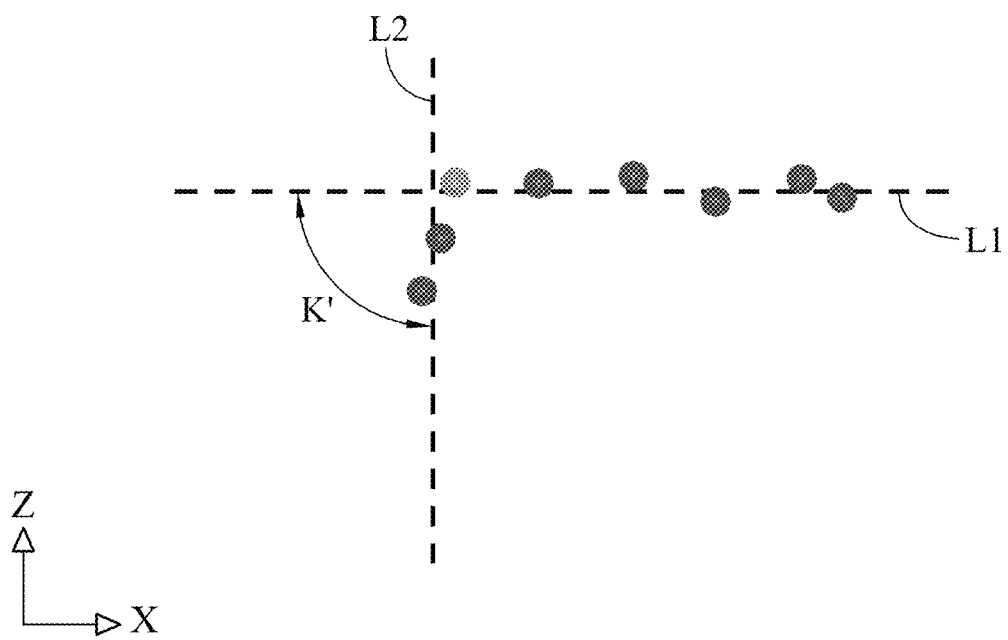
FIG. 13B is a schematic view showing a data point distribution of a straight hole of FIG. 12.

Furthermore, FIG. 13A is a schematic view showing a data point distribution of a countersunk hole of FIG. 12 and FIG. 13B is a schematic view showing a data point distribution of a straight hole of FIG. 12. Please refer to FIG. 3, FIG. 13A and FIG. 13B together, and there are multiple data points along any one of the cross-section directions C1 to C8. In FIG. 13A, an included angle K is between a reference line L1 and a reference line L2. In FIG. 13B, an included angle K' is between the reference line L1 and the reference line L2. As shown in FIG. 3, eight included angles between the cross-section directions C1 to C8 are the same as the included angle K of FIG. 13A, the included angle standard deviation related to the cross-section directions C1 to C8 will be less than the third threshold, and the hole is determined as a countersunk hole. Conversely, when the eight included angles between the cross-section directions C1 to C8 may comprise the included angle K of FIG. 13A or the included angle K' of FIG. 13B, the included angle standard deviation related to the cross-section directions C1 to C8 will be greater than or equal to the third threshold value, and the hole is determined as the straight hole.

When the hole is determined as the straight hole according to the hole type judgment process, the edge obtained by the step S107 of FIG. 1 is the edge of the straight hole. When the hole is determined as the countersunk hole according to the hole type judgment process, the edge obtained by the step S107 of FIG. 1 is only the edge of the outer hole of the countersunk hole. Therefore, when the hole is determined as the countersunk hole, the first region image of the two-dimensional image in the step S102 further comprises the third region image, and the third region image has the smallest grayscale intensity in the first region image, thereby estimating a position of the third region image as a position of the inner hole of the countersunk hole and defining a contour of the third region image as a fourth contour. After obtaining the fourth contour, the steps S103 to S107 of FIG. 1 are sequentially performed for the fourth contour, thereby obtaining the edge of the inner hole of the countersunk hole.

In view of the above description, at present, the measurement of three-dimensional holes still mostly depends on the manual use of plug gauges. When a large number of holes need to be measured, it is not only time-consuming but also the accuracy for measuring the 3D holes is difficult to be consistent. The method for measuring the hole provided in the workpiece recited in the present disclosure first use the reflection intensity information of the two-dimensional image to estimate the position of the hole provided in the surface of the workpiece, thereby solving prior disadvantages of processing a huge amount of data points and taking much time to obtain the three-dimensional point cloud of the workpiece, and achieving an object of measuring the 3D holds rapidly. Furthermore, through the usage of the two-dimensional image and the three-dimensional point cloud model, it is possible to more accurately determine whether the data points conform to the edge of the hole provided in the workpiece, to achieve an effect of accurately measuring and rapidly achieving a full inspection for the holes provided in the workpiece.

What is claimed is:

1. A method for measuring a hole provided in a workpiece, and the method comprising:
   respectively obtaining a three-dimensional point cloud model of the workpiece and a two-dimensional image of the workpiece;
   defining a first contour in the three-dimensional point cloud model according to an intensity difference of the two-dimensional image;
   respectively defining a second contour and a third contour in the three-dimensional point cloud model based on the first contour;
   bounding a data point testing region, wherein the second contour and the third contour are boundaries of the data point testing region respectively;
   respectively defining a plurality of data point sampling regions along a plurality of cross-section directions of the data point testing region, wherein each of the cross-section directions extends from the third contour to the second contour;
   respectively sampling a plurality of data points in the data point sampling regions to obtain a turning point set, wherein the turning point set has a plurality of turning points, the turning points respectively are distributed in the data point sampling regions and the turning points have the largest turning margins in the data point sampling regions respectively; and
   connecting the turning points which are distributed in the turning point set along a ring direction to obtain an edge of the hole.

2. The method in claim 1, wherein the two-dimensional image includes a first region image and a second region image, a grayscale intensity of the first region image is smaller than a grayscale intensity of the second region image, and a position of the first region image is estimated to correspond to a position of the hole provided in a surface of the workpiece.

3. The method in claim 1, wherein the first contour has a center point, the first contour, the second contour and the third contour commonly share the center point, the first contour surrounds the second contour, there is a first radius ratio between the first contour and the second contour, the third contour surrounds the first contour and the second contour, there is a second radius ratio between the third contour and the first contour, and the first radius ratio is equal to the second radius ratio.

4. The method in claim 1, wherein there is a first radius ratio between the first contour and the second contour, there is a second radius ratio between the third contour and the first contour, and the first radius ratio is different from the second radius ratio.

5. The method in claim 1, wherein respectively sampling the plurality of data points in the data point sampling regions to obtain the turning point set comprises: respectively calculating Z-axis standard deviations of the data point sampling regions; performing a linear fitting algorithm for the data point sampling regions to obtain a plurality of data point sampling segments based on the Z-axis standard deviations, wherein widths of the data point sampling segments respectively are the same as the Z-axis standard deviations; respectively removing the data points which distribute outside the data point sampling segments; and performing a window algorithm for the data point sampling segments to obtain the turning point set.

6. The method in claim 1, further comprising removing noises in the turning point set after connecting the turning points which are in the turning point set along the ring direction to obtain the edge of the hole provided in the workpiece.

7. The method in claim 6, wherein removing noises in the turning point set comprises: mapping an elliptic ring to the turning point set; removing the turning points which distribute outside the elliptic cubic ring; determining whether an included angle is greater than or equal to a first threshold, wherein the included angle is between a first line and a second line, the first line is defined by one of the turning points which is distributed in the elliptic ring and an elliptical center point, and the second line is defined by another one of the turning points which is distributed in the elliptic ring and the elliptical center point; sampling the turning points which distribute in the elliptic ring to obtain an edge point set when the included angle is greater than or equal to the first threshold; decreasing a ring radius of the elliptic ring continuously until the included angle is greater than or equal to the first threshold when the included angle is less than the first threshold.

8. The method in claim 1, further comprising performing a hole type judgment process after connecting the turning points which are distributed in the turning point set along the ring direction.

9. The method in claim 8, wherein the hole type judgment process comprises: calculating an outer data point density of the data points which are distributed outside the edge of the hole; calculating an inner data point density of the data points which are distributed inside the edge of the hole; determining whether a density difference between the outer data point density and the inner data point density is greater than or equal to a second threshold, wherein the hole is determined as a straight hole when the density difference is greater than or equal to the second threshold.

10. The method in claim 9, wherein the hole type judgment process further comprises: determining whether an included angle standard deviation which is between an inside wall of the hole and a surface of the workpiece is greater than or equal to a third threshold when the density difference is less than the second threshold, wherein the hole is determined as a straight hole when the included angle standard deviation is greater than or equal to the third threshold, and the hole is determined as a countersunk hole when the included angle standard deviation is less than the third threshold.

* * * * *